INVENTOR.

Howard M. Strobel

Patented June 13, 1950

2,511,485

UNITED STATES PATENT OFFICE 2,511,485

INERTIA CONTROL SYSTEM FOR INDICATORS

Howard M. Strobel, New York, N. Y.

Original application October 25, 1940, Serial No. 362,885. Divided and this application February 29, 1944, Serial No. 524,491

13 Claims. (Cl. 171—95)

This invention relates to the control of inertial effects in mechanical systems, and particularly to moving mechanical systems in which a predetermined mode of motion is desired from the application of a limited actuating force, or in which it is desired that the mode of motion of a mechanical system accurately respond to a given actuating force function.

In my application Serial No. 362,885, filed October 25, 1940, and patented June 13, 1944, as Patent No. 2,351,079, I disclosed method and means for controlling the effective mass of movable mechanical systems and in particular that of the movable element of a pickup device. This application is a division of the aforesaid patent application.

The object of the invention is to reduce the effective inertia, and the effects due to inertia forces, of a given movable mass (such as an indicating or recorder element) when it is energized to indicate a mode of displacement which is substantially proportional to the actuating force function.

In some types of moving mechanical systems the actuating force is given, and it is desired that the response of the movable element of the mechanical system should be an accurate indication of said actuating force. An example of such a system would be the indicating pointer or element of a voltmeter or mirror oscillograph, in which it is desired that the instantaneous deflection (or scale reading) of the movable element of the mechanical system be always directly proportional to the actuating force derived from the impressed voltage function. Due to the mass inertia of the mechanical system, the indicating pointer will tend to lag behind an increasing force function having a positive acceleration component, and will tend to overshoot a decreasing force function having a negative acceleration component. That is to say, that when the acceleration of the system is positive (increasing), the pointer lags, and when the acceleration is negative (decreasing), the pointer overshoots the true scale reading of the actual impressed force or voltage function.

The above are illustrations of how the inherent mass within any given mechanical system subjected to a mode of motion produces inertial forces that give rise to detrimental and undesired effects. Subsidiary objects of the invention are to overcome the above-named types of difficulties.

I accomplish these and other objects by providing means for analyzing the indicator energizing function (i. e., quantity of energy whose value varies with respect to time) which is proportional to the desired displacement function of the mechanical system, herein called the "secondary system," to obtain the equivalent component acceleration function of the said given energizing function. The equivalent acceleration component thus derived, herein designated as "A," is then modified by some gain or amplifying factor, herein designated as "K," the resulting modified acceleration factor KA then being used to create and control a supplementary force acting on the mechanical secondary system in such a direction as to decrease the undesired inertial effects thereof.

In my Patent No. 2,351,079 of which this application is a division, a more complete description of the application of my inertia control system is given, and in particular as to its adaptation to a pickup device, wherein I obtain the input voltage energizing function for the analyzer from the pickup's mechanical secondary system. However, in other types of mechanical systems it may be possible and more convenient to obtain the input function to the analyzer from the primary energizing system. For example, in the case of the primary energizing system yielding a voltage which creates a primary force to actuate an indicating pointer (secondary system), the input to the analyzer may be taken directly from the primary energizing voltage. This can be analyzed for the equivalent acceleration component A, which is then modified by the factor K, giving KA. The KA can then be converted to a supplementary force acting on the secondary system, and in this case the primary system of the indicator itself can also be used to make the conversion. The means by which the desired inertia feed-in can be effected without producing undesired coupling effects to the input of the analyzer are familiar to the art, one means being by the use of a bridge circuit. Another means would be to inject into the analyzer input mesh a bucking voltage from the analyzer output so as to cancel any undesired feed-back. Still another means would be to direct the energizing voltage through an amplifier and then combine the amplifier and analyzer outputs to drive the indicator. Since the amplifier amplifies but in one direction, the analyzer output is thus completely de-coupled from its input (similar to Fig. 3).

In an indicatnig device (such as a voltmeter) the total force actuating the movable indicating element or pointer is some force $F_v$ proportional to the energizing voltage source. Assuming the frictional forces of the indicating element to be negligible, then all of the actuating force $F_v$ is used in overcoming the accelerating froce $F_{acc}$ and the spring force $F_s$ of the indicating element. That is, $$F_v = F_s + F_{acc}$$

and $$F_s = F_v - F_{acc}$$

Hence the displacement function of the pointer will fail to follow the energizing voltage function to the extent force $F_{acc}$ is required to accelerate the pointer. The force $F_{acc}$ required to accelerate the pointer is given by the formula $F_{acc} = MA$, where M is the movable mass and A the acceleration function. As mentinoed above, the supplementary force $F_{sup} = KA$, and is used to overcome the inertia effects due to mass M. Hence, $$F_s = F_v - (F_{acc} - F_{sup})$$
$$= F_v - (MA - KA)$$
$$= F_v - (M - K)A$$

It will be noted that if the gain factor K (which fixes or determines the amplitude of the supplementary force function $F_{sup}$) is made equal to mass M, the inertial effects due to acceleration component A reduce to zero, and all of the actuating force $F_v$ is used in balancing the pointer spring tension force $F_s$. As a result, the pointer displacement function is always instantaneously proportional to the energizing voltage function.

It will be observed that the above type of secondary system exists in many forms of indicators or mechanically responsive devices, such as the moving element in voltmeters or in mirror oscillographs, electric recorders, electric engravers, and audio reproducers, to state a few of the more obvious types.

More particularly, the invention consists in the system and method hereinafter described, illustrated in the accompanying drawings and defined in the claims hereto appended, it being understood that various changes in form, arrangement and details both of circuits and of method within the scope of the claims may be resorted to without departing from the spirit of the invention.

For a clearer comprehension of the invention reference is directed to the accompanying drawings which illustrate a preferred embodiment thereof, wherein.

Figure 1:
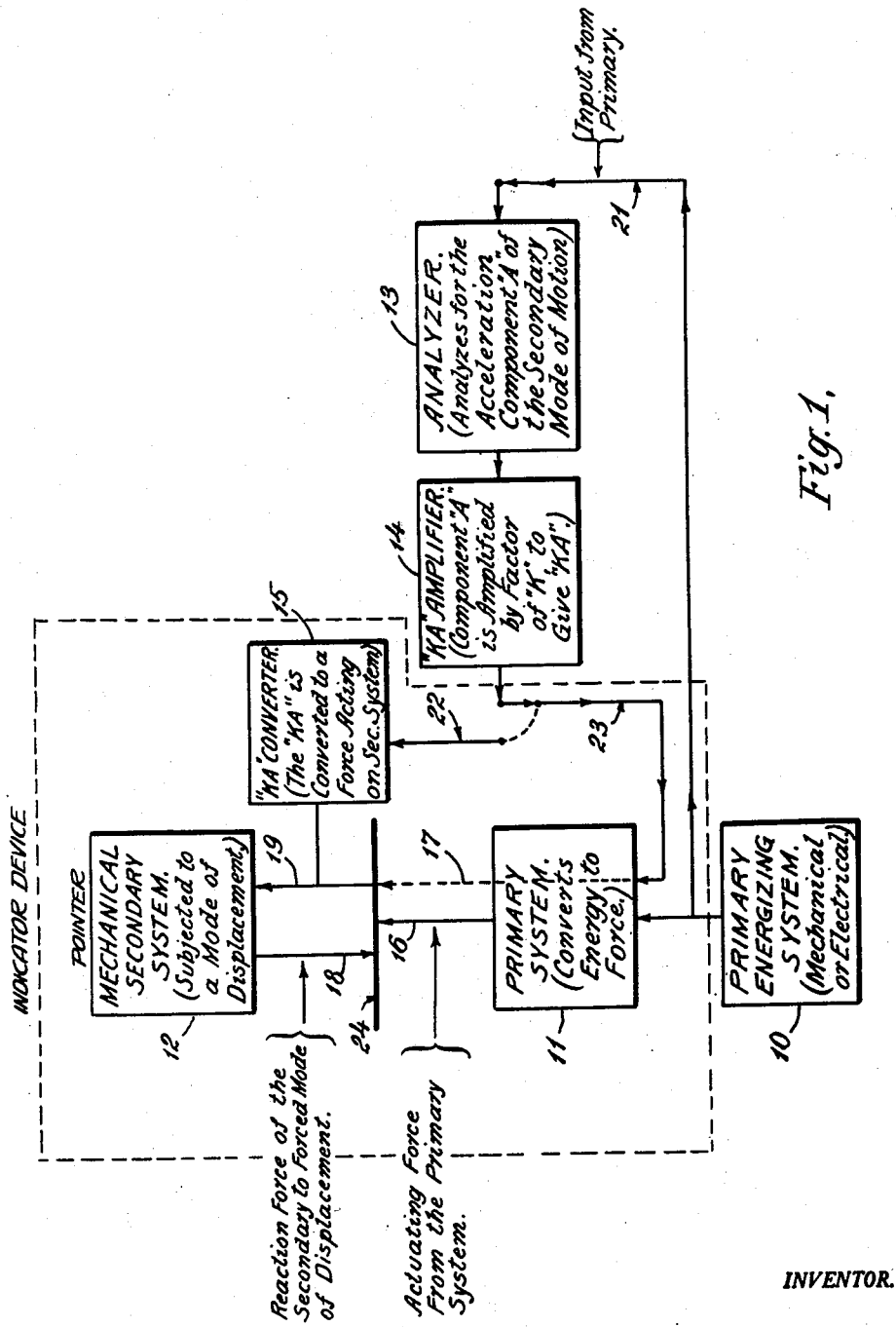
Figure 1 is a block diagram of the system of the invention in general form wherein each block represents a component of the system and is lettered to substantially describe its function.
Figure 2:
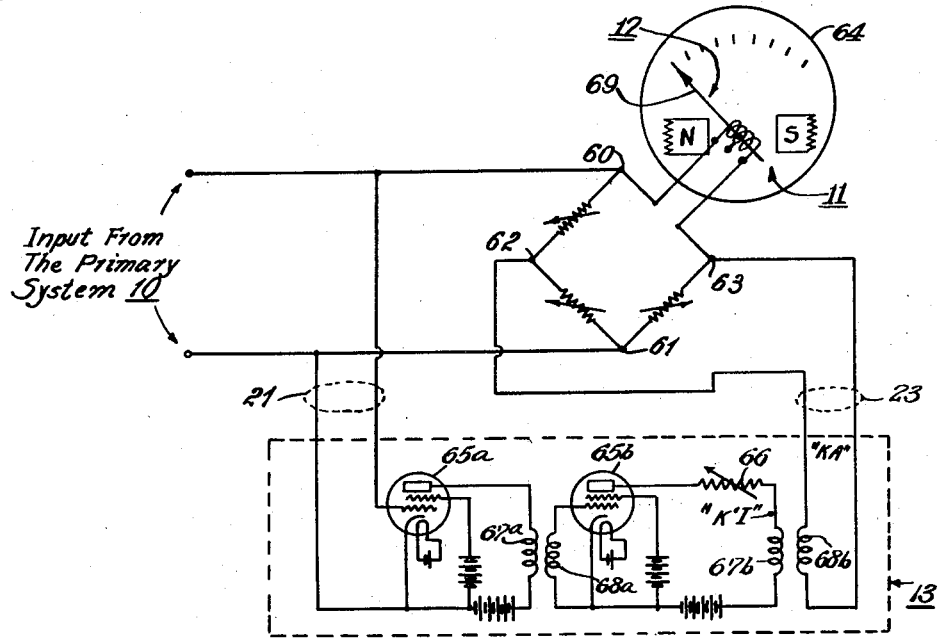
Figure 2 shows one application of the inertia control system wherein the input to the analyzer is taken directly from the primary energizing system, and in which the primary system converter is also used to convert the supplementary energy to a supplementary force. This is the arrangement represented in the block diagram of Figure 1 when the supplementary "KA" converter is not used.
Figure 3:
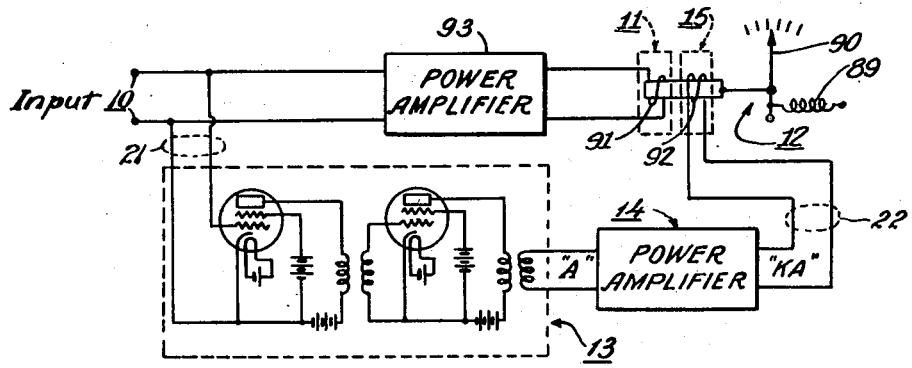

Figure 3 shows an application similar to that in Figure 2, except that a separate supplementary force converter is placed in the mechanical secondary system. The separate supplementary force converter is the additional coil actuating the movable element, and is substantially equivalent to the alternative arrangement represented in the block diagram of Figure 1, wherein 15 is the supplementary converter.

In the block diagram of Figure 1 each block represents some part or function of the acceleration feed-in inertia control system. Block 10 represents the primary energizing system, by which energy in electrical form is supplied to the converter 11 of the primary system. The converter 11 transforms its received energy to a primary force 16 which acts on the secondary system 12 through some line or surface of contact or interaction 24. In the conventional indicators to which this invention might be applied a common form of converter 11 is a coil attached to a movable indicating element (secondary system 12) in the region of a suitable fixed magnetic field. Thus when an energizing voltage sends a proportional current through the coil, an actuating force (primary force 16) causes the movement or displacement of the indicating element (secondary system 12) against the restraining force of its centering or positioning spring, thus by the extent of its displacement indicating the magnitude of the primary energizing voltage. The reaction force of the secondary system to the forced mode of motion is indicated by the arrow 18, which opposes primary force arrow 16. The block 12 represents the secondary system, which may be any kind of mechanical system that is subjected to a given mode of motion, such as the movable pointer of an indicating device. The elements 10 (an energizing source), 11 (conventional means for developing a proportional actuating force from the energizing source), and 12 (a movable indicating element having mass) are present in one form or another in all systems to which this invention might be applied.

The analyzer 13 analyzes the primary energy supplied to actuate the secondary system for its second derivative or equivalent acceleration component A. The input to the analyzer 13 as shown in this invention comes directly from the primary energizing system 10—11 as indicated by the line 21, and the desired mode of motion to be imparted to the secondary system is analyzed. That is to say, if the secondary system 12 were a movable element of an indicator which possessed zero mass, it would have no inertia effects, and would thus respond instantly to any actuating force 16 applied to it to give the desired response. Hence, its displacement along a scale would always be proportional to the applied force 16. However, since the secondary system 12 has mass, inertial effects are present which prevent the movable element from instantly and exactly following the applied force function developed from the applied primary energizing source. The acceleration component A goes to an amplifier 14, where it is modified by a gain factor K. It will be noted that it is the KA output of the analyzer and amplifier that is desired, and therefore the amplifier could just as well precede or be incorporated within the analyzer. The output KA of the amplifier is then converted to a proportional supplementary force acting on the secondary mechanical system 12. The conversion may take place along the alternative line 22 through a converter 15 which creates a supplementary force 19 acting on the secondary system 12; or the amplifier 14 KA output may take the indicated line 23 to the primary converter system 11 which produces the supplementary force 17 acting on the secondary system 12. In those indicator systems where the latter indicated line 23 is applicable no additional converter 15 is necessary. However, special precautions may be required to prevent undesired coupling effects.

In the method depicted in Figure 1 the secondary system 12 is necessarily a movable indicating element or mechanical system possessing a certain mass. The total actuating force 16 required to maintain the secondary system 12 in a given mode of motion may be broken up into three parts: (1), the component of force required to overcome the elastance of the system, which is proportional to displacement (as of a spring); (2), the component of force required to overcome the damping or frictional resistance of the system, which is proportional to velocity; and (3), the component of force required to overcome the inertia of the system, which results from the fact that for a given mass a component of force proportional to the acceleration desired must be applied in order to accelerate or decelerate any mass. It will be noted that the first force is proportional to the displacement, the second roughly proportional to velocity, and the third proportional to the acceleration, of the movable secondary system. Thus, if the movable element of a voltage indicator device possessed no mass, then its displacement would always be substantially proportional to the primary energizing voltage applied to the actuating coil, for example, of the movable element or secondary system. With this approach, the variations in the primary energizing voltage may be considered as being equivalent to the motional variations of the indicator movable element itself. Thus the analyzer 13 analyzes the primary energy source for its equivalent acceleration component effect (part 3 above) upon the secondary system 12. It may do this by taking the time rate of change of the equivalent velocity; or it may first take the time rate of change of the equivalent displacement, which gives the equivalent velocity, and then take the time rate of change of this equivalent velocity, which gives the equivalent acceleration component desired. The means of analysis by differentiation are here shown to be by use of electrical devices well known to the art.

The acceleration component A output from the analyzer 13 is amplified by the factor K by the amplifier 14, giving an amplifier 14 output of KA. The gain factor K determines the amplitude of the equivalent acceleration component function, and is adjusted to be substantially proportional to the mass of the secondary system. Having created the KA, it remains but to convert it into a supplementary force acting on the secondary system 12. This may be done along the alternative line 22 by using a separate converter 15 to create the supplementary force 19, or if the type of primary converter 11 is such that it can use the KA output of 14 directly, then the conversion can take place along the indicated line 23 to the primary converter 11 thus creating supplementary force 17 which also acts on the secondary system 12. Illustrative applications of some of the various possible combinations of elements of the system will be described in some of the following figures.

Figure 2 shows one application of the invention as outlined in Figure 1. Figure 2 uses the sequence of operations indicated in Figure 1, wherein the input to the analyzer 13 is taken from the primary system 10 along the line 21, and the output of the analyzer 13 is fed to the primary converter system 11 along the line 23. In Figure 2, the KA amplifier 14 is omitted since the analyzer 13 performs some amplification in the steps of converting the input voltage 21 to a proportional current K'I preparatory to analyzing for the KA acceleration component output 23. Prevention of undesired coupling between adjacent circuits, as of KA 23 to either 10 or 21, is effected by means of a balanced bridge circuit having the pairs of terminals 60—61 and 62—63.

In the operation of the circuit of Figure 2, some primary energizing circuit provides an input voltage to the terminals 10, thus applying a voltage across the bridge terminals 60—61. The secondary system 12 comprising the indicating meter 64 with its indicating needle 69 is in one arm of the bridge, and the needle 69 gives an indication proportional to the voltage applied. The meter 64, by conventional construction of a voltmeter, comprises: a primary converter 11, a common type being a current-carrying coil in a magnetic field which gives a deflecting force that is proportional to the current; a movable mass or mechanical secondary system 12, which commonly consists of a pivoted needle (here 69); the mass of the moving coil; and a spring, the primary force then deflecting the needle or pointer 69 against the spring tension. It will be noted that the current coil of the primary converter system 11 which produces the actuating primary force by reacting against a stationary magnetic field is incorporated within the moving mechanical secondary system 12, and so adds to its mass. Normally, due to the inertia of the secondary system 12, rapid variations in the applied voltage may cause the indicating pointer to lag behind or overshoot the actual instantaneous applied voltage. To control undesired inertia effects of the secondary system 12 (or needle 69), the input voltage 10 is applied to the analyzer 13 along the conductors 21. The analyzer 13 is shown as an analyzer with two differentiating steps, having electronic tubes 65a and 65b, wherein the first circuit 65a, 67a, 68a converts the primary voltage (equivalent displacement function) into a proportional current and analyzes it for its time rate of change, thus applying a voltage (equivalent velocity component) to tube 65b, which in turn converts it into a proportional current output, K'I, where "K'" designates some factor of amplification. In order that the output currents of the tubes 65, 65b, be in phase and proportional to the impressed voltage function, the circuits should be predominately resistive, since reactive elements would introduce undesired phase shifts. The variable resistor 66 affords a means of controlling or adjusting the current output and hence determines the amplitude of the analyzer output. The K'I current (equivalent velocity function) goes to the coupled coils 67b and 68b, thus inducing in coil 68b a voltage (equivalent acceleration component) KA proportional to the time rate of change of current in coil 67b according to well known electrical principles. Briefly, this principle of transformer action is that if a current is flowing in one of two coupled coils, the voltage induced in the other coil is proportional to the time rate of change of current in the first coil. That is to say, the voltage function thus induced is proportional to the derivative of the current function of the current in the first coil. Hence, the transformer action of the coupled coils furnishes one means of electrically differentiating a given function. Other methods of differentiating by use of electrical means are also known to the art. The resulting KA voltage is applied to the indicating meter 64 through the conductors 23 and bridge terminals 62—63. The phase polarity of the KA feed-in will determine operation of the apparatus. If positive, then when the primary acceleration force is increasing the supplementary acceleration force will aid, and vice versa. On the other hand, if the feed-in is negative, then when the primary acceleration force is increasing the supplementary acceleration force will oppose, and vice versa, so that in effect the negative feed-in of the acceleration component and its conversion to a proportional supplementary force simulates an increase in the effective mass of the secondary system.

Figure 3 shows another application of the invention, wherein it is desired to reduce the inertial effects of a secondary system 12 comprising an indicating element 90 which is normally energized by the primary converter system 11 with its drive coil 91. Figure 3 uses the sequence of operations indicated in Figure 1, wherein the input to the analyzer 13 is taken from the primary system 10 along the line 21, and the output of the analyzer 13 and amplifier 14 is fed to the supplementary converter system 15 along the line 22. Here the input to the analyzer 13 is taken from the primary energizing system 10 along the line 21. The KA converter 15 for creating the supplementary force acting upon the indicating element 90 of secondary system 12 (and against the tension of spring 89) is realized, however, by a separate drive coil 92 energized by the KA amplifier along the line 22. The operation of the individual component parts of the system is, in general, similar to those previously described.

In comparing the circuit of Figure 3 with that of Figure 2, it will be observed that the power amplifier 93 and its indicator or recorder unit could be substituted in place of indicating meter 64 in the bridge circuit of Figure 2. In this case, of course, the supplementary converter 15 with its drive coil 92 and its associated apparatus would not be necessary.

Several modified forms of indicating apparatus embodying my invention have been illustrated and described in order to show that the invention is not limited to any specific structure and I intend no limitations other than those imposed by the appended claims.

I claim:

1. In an inertia control circuit for indicator apparatus, a balanced passive bridge circuit with substantially linear impedances, an indicating device connected in one arm of said bridge, said indicating device including a movable element, one pair of terminals of said bridge being electrically energized by a given primary energizing source, means for continuously analyzing the given primary electrical energy for its second derivative with respect to time, means for generating a voltage component proportional to said derivative, means determining the amplitude of said voltage component, and means for applying a supplementary electrical energizing source continuously and proportionately controlled by said modified voltage component to the other pair of terminals of said bridge.

2. In an inertia control circuit for indicating apparatus, a balanced passive bridge circuit with substantially linear impedances, an indicating device connected in one arm of said bridge, said indicating device includng a movable element, one pair of terminals of said bridge being energized by a given voltage function, means for continuously analyzing the given voltage function for its second time derivative component, said analyzing means including successive means for converting a voltage function into a similar current function with means for obtaining therefrom a voltage proportional to the rate of change of said current function, means determining the amplitude of said derived component voltage function, and means for continuously applying said modified derived voltage function to the other pair of terminals of said bridge.

3. In an inertia control circuit for indicating apparatus, a balanced passive bridge circuit with substantially linear impedances, an indicating device connected in one arm of said bridge, said indicating device including a movable element, one pair of terminals of said bridge being energized by a given voltage function, an analyzer for continuously analyzing the given voltage function for its second time derivative component and for creating a voltage proportional thereto, said analyzer including two successive differentiating circuits each including a linearly operated electronic vacuum tube having input and output circuits, said input circuits being energized by a voltage function and causing a proportional current to flow in said output circuits, said output circuits each including a primary coil magnetically linked to a secondary coil so that the voltage induced in each secondary coil is substantially proportional to the rate of change of current in its primary coil, an amplifier energized by the voltage induced in said final secondary coil and giving an output voltage similar in wave form to said derived voltage component, said voltage component being applied to the other pair of terminals of said bridge circuit.

4. In an inertia control circuit for indicating apparatus, an indicating device connected in one arm of a balanced passive bridge circuit having substantially linear impedances, said indicating device including a movable element, one pair of terminals of said bridge circuit being energized by a given voltage function, an analyzer for continuously analyzing the given voltage function for its second derivative with respect to time and for creating a voltage proportional thereto, said analyzer including two successive differentiating circuits each including a linearly operated electronic tube device having input and output circuits, said input circuits being energized by a voltage function and causing a proportional current to flow in said output circuits, said output circuits each including a primary coil magnetically linked to a secondary coil so that the voltage induced in each secondary coil is substantially proportional to the rate of change of current in its primary coil, means determining the voltage amplitude of said derived component, and said component voltage being applied to the other pair of terminals of said bridge circuit.

5. In an inertia control circuit for indicating apparatus, an indicating device connected in one arm of a passive bridge circuit having substantially linear impedances, said indicating device including a movable element, one pair of terminals of said bridge being energized by a given voltage function, an analyzer for continuously analyzing the given voltage function for its second derivative with respect to time and for creating an electrical output proportional thereto, said analyzer including a differentiating circuit, means determining the amplitude of said analyzer output, and means for applying said analyzer output to the other pair of terminals of said bridge circuit.

6. Electric device for controlling the inertial effects in the movement of the movable element of an indicator device, said element being actuated by the ponderomotive force developed between an energized coil and a given magnetic field of said indicator, so that the displacement of said element be at every moment substantially proportional to the impressed electrical energy comprising: a source of electrical energy, an analyzer including means to electrically differentiate the input circuit energizing function to continuously obtain its second derivative with respect to time and for creating an output voltage proportional thereto, means to impress a portion of said electrical energy on the input circuit of said analyzer, an indicator device, means to connect said electrical energy of said source with a coil of the indicator device, an auxiliary coil fastened to said movable element and able to move in the magnetic field of said indicator device, and means to connect said auxiliary coil to the output circuit of the analyzer.

7. In an inertia controlled indicator apparatus, said indicator having a movable member of given mass, said member being actuated by an energized drive coil reacting against a given magnetic field to give an actuating force substantially proportional to the input energizing voltage function, an analyzer for continuously analyzing said input voltage function for its second derivative component with respect to time and for producing an electrical output substantially proportional thereto, said analyzer including a substantially linearly operated vacuum tube having grid and plate circuits, said grid circuit being energized by said input voltage function and causing a current proportional thereto to flow in said plate circuit, said plate circuit including a primary coil magnetically linked with a secondary coil so that the voltage induced in the secondary coil is proportional to the rate of change of current with respect to time in the primary coil, an amplifier, which amplifies said analyzer voltage output and produces an energy output proportional to said component and of a given amplitude, and a supplementary drive coil attached to said member in the region of a stationary magnetic field, said supplementary drive coil being energized by the output of said amplifier.

8. Electric device for controlling the inertial effects in the movement of the movable element of an electrical indicator device, said element being actuated by the ponderomotive force developed between an energized coil and a given magnetic field of said indicator, so that the displacement of said element be at every moment substantially proportional to the impressed electrical signal energy of a given source comprising: a source of electrical signal energy, an analyzer including means to electrically differentiate the input circuit energizing function to continuously obtain its second derivative with respect to time and for creating an output voltage proportional thereto, means to impress a portion of said electrical signal energy on the input circuit of said analyzer, an indicator device, means to connect said electrical signal energy of said source with said coil of the indicator device, an auxiliary coil fastened to said movable element and able to move in the magnetic field of said indicator device, and means to connect said auxiliary coil to the output circuit of the analyzer.

9. Electric device for controlling the inertial effects in the movement of the movable element of an electrical indicator device so that the displacement of said element be at every moment substantially proportional to the electrical signal energy impressed on said indicator device comprising: a source of electrical signal energy, an analyzer including means to electrically differentiate the input circuit energizing function to continuously obtain its second derivative with respect to time and for creating an output voltage substantially proportional thereto, means to impress a portion of said electrical signal energy on the input circuit of said analyzer, an indicator device, said indicator including a coil structure and a given magnetic field restrained from relative movement by a compliant member and being adapted to actuate said movable element so as to indicate by the relative displacement thereof the magnitude of the ponderomotive force developed between said coil structure and said field when said coil structure is energized, an amplifier, means to connect said electrical signal energy of said source to the input of said amplifier, means to connect the output of said amplifier to the coil structure of the indicator device, and means to connect the output of said analyzer to said coil structure.

10. Electric device for controlling the inertial effects in the movement of the movable element of an electrical indicator device so that the displacement of said element be at every moment substantially proportional to the electrical signal energy impressed on said indicator device comprising: a source of electrical signal energy, an analyzer and amplifier device including means to electrically differentiate the input circuit energizing function to continuously obtain its second derivative with respect to time and for creating an output voltage substantially proportional thereto and having a given predetermined amplitude, means to impress a portion of said electrical signal energy on the input circuit of said analyzer and amplifier device, an indicator device, said indicator including a coil structure and a given magnetic field restrained from relative movement by a compliant member and being adapted to actuate said movable element so as to indicate by the relative displacement thereof the magnitude of the ponderomotive force developed between said coil structure and said field when said coil structure is energized, an amplifier, means to connect said electrical signal energy of said source to the input of said amplifier, means to connect the output of said amplifier to the coil structure of the indicator device, and means to connect the output of said analyzer and amplifier device to said coil structure.

11. Electric device for controlling the inertial effects in the movement of the movable element of an electrical indicator device so that the displacement of said element be at every moment substantially proportional to the electrical signal energy impressed on said indicator device comprising: a source of electrical signal energy, an analyzer including means to electrically differentiate the input circuit energizing function to continuously obtain its second derivative with respect to time and for creating an output voltage substantially proportional thereto, means to impress a portion of said electrical signal energy on the input circuit of said analyzer, an indicator device, said indicator including a coil structure and a given magnetic field restrained from relative movement by a compliant member and being adapted to actuate said movable element so as to indicate by the relative displacement thereof the magnitude of the ponderomotive force developed between said coil structure and said field when said coil structure is energized, means to unidirectionally feed a portion of said electrical signal energy of said source to said coil structure, and means to connect the output of said analyzer to said coil structure.

12. Electric device for controlling the inertial effects in the movement of the movable element of an electrical indicator device so that the displacement of said element be at every moment substantially proportional to the electrical signal energy impressed on said indicator device comprising: a source of electrical signal energy, an analyzer and amplifier device including means to electrically differentiate the input circuit energizing function to continuously obtain its second derivative with respect to time and for creating an output voltage substantially proportional thereto and having a given predetermined amplitude, means to impress a portion of said electrical signal energy on the input circuit of said analyzer and amplifier device, an indicator device, said indicator including a coil structure and a given magnetic field restrained from relative movement by a compliant member and being adapted to actuate said movable element so as to indicate by the relative displacement thereof the magnitude of the ponderomotive force developed between said coil structure and said field when said coil structure is energized, means to unidirectionally feed a portion of said electrical signal energy of said source to said coil structure, and means to connect the output of said analyzer and amplifier device to said coil structure.

13. Electric device for controlling the inertial effects in the movement of the movable element of an electrical indicator device so that the displacement of said element be at every moment substantially proportional to the electrical signal energy impressed on said indicator device comprising: a source of electrical signal energy, an analyzer and amplifier device including means to electrically differentiate the input circuit energizing function to continuously obtain its second derivative with respect to time and for creating an output voltage substantially proportional thereto and having a given predetermined amplitude, means to impress a portion of said electrical signal energy on the input circuit of said analyzer and amplifier device, an indicator device, said indicator including a coil structure and a given magnetic field restrained from relative movement by a compliant member and being adapted to actuate said movable element so as to indicate by the relative displacement thereof the magnitude of the ponderomotive force developed between said coil structure and said field when said coil structure is energized, means to unidirectionally feed a portion of said electrical signal energy of said source to said coil structure, an auxiliary coil structure fastened to said movable element and able to move in the magnetic field of said indicator device, and means to connect the output of said analyzer and amplifier device to said auxiliary coil structure.

HOWARD M. STROBEL.

REFERENCES CITED

The following references are of record in the file of this patent:

UNITED STATES PATENTS

| Number | Name | Date |
|---|---|---|
| 1,626,560 | Schneider | Apr. 26, 1927 |
| 1,645,305 | Slepian et al. | Oct. 11, 1927 |
| 1,743,252 | Tanner | Jan. 14, 1930 |
| 1,822,758 | Toulon | Sept. 28, 1931 |
| 1,850,640 | Sperry | Mar. 22, 1932 |
| 1,967,125 | Miller | July 17, 1934 |
| 1,988,458 | Minorsky | Jan. 22, 1935 |
| 2,088,654 | Hull | Aug. 3, 1937 |
| 2,167,011 | Tellegen | July 25, 1939 |
| 2,169,762 | Kaye | Aug. 15, 1939 |
| 2,184,978 | Nyquist | Dec. 26, 1939 |
| 2,251,549 | Klipsch | Aug. 5, 1941 |
| 2,275,747 | Fearon | Mar. 10, 1942 |
| 2,304,740 | Minton | Dec. 8, 1942 |
| 2,351,079 | Strobel | June 13, 1944 |
| 2,351,353 | McCarty | June 13, 1944 |